Patented Mar. 31, 1936

2,035,896

UNITED STATES PATENT OFFICE 2,035,896

LIBERATION OF OXYGEN FROM SODIUM PERBORATE

Frank C. Kerwin, Brooklyn, N. Y.

No Drawing. Application December 10, 1931, Serial No. 580,213

6 Claims. (Cl. 167—93)

This invention relates to the liberation of oxygen from sodium perborate by the use of catalase. The invention includes not only the method of liberating oxygen from perborate, but, it also includes combination of catalase and perborate from which oxygen may be liberated, and baths containing perborate and catalase for use in physiotherapy. The invention also includes a new and more stable catalase extract and the method of preparing this extract.

The therapeutic value of sodium perborate has previously been recognized and it is used in the treatment of diseased conditions of the gums and mouth and is otherwise employed where the liberation of oxygen is useful. However, the amount of oxygen released from sodium perborate when added to water is small, and ordinarily not more than ten percent of the available oxygen in the perborate is liberated.

I have found that catalase, or extracts of catalase, act as a catalyst in liberating oxygen from sodium perborate, and a small amount of catalase will liberate substantially all of the available oxygen in the perborate. Catalase liberates about seventy-five (75) times as much oxygen from perborate as water alone. Combinations of catalase and sodium perborate, therefore, have even greater therapeutic value than sodium perborate alone.

When catalase and sodium perborate are added to water, the greater part of the available oxygen in the perborate is liberated in a short time— possibly a fraction of a minute, and the water becomes filled with a very large number of minute bubbles of the oxygen.

As sodium perborate goes into solution in water, the following reactions apparently take place and an alkaline solution is produced:

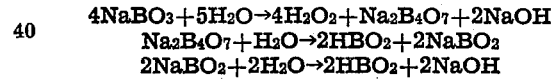

However, in the presence of catalase the oxygen is liberated from perborate almost immediately and before the perborate would dissolve in an aqueous solution containing no catalase. At 60° C. it requires approximately two hours to completely dissolve or decompose five grams of sodium perborate in 100 cc. of water and the liberation of oxygen is hardly perceptible to the eye. By the addition of catalase a 5% solution is completely decomposed in a few seconds to a few minutes depending upon the temperature, and even a much larger amount of sodium perborate may be decomposed in this amount of water within a relatively short time in the presence of catalase. There is no increase, or only a very slight increase in temperature. The alkaline solution produced tends to prevent or retard the escape of the oxygen from the solution to the surrounding atmosphere and a foamy mass of high oxygen content is produced.

I have found that such a solution filled with fine bubbles of oxygen liberated from sodium perborate by catalase makes an excellent mouth wash. The oxygen sterilizes the teeth and gums and the teeth are cleansed, and with continued treatment are made very white. The oxygen itself, or the bubbling or stirring effect of the liberation of the oxygen from the perborate, or both, removes the film from the teeth. Moreover, the bubbling action produced by the liberation of the oxygen from the sodium perborate has a desirable physio-therapeutic effect on the gums. The invention includes both the treatment of the teeth and the treatment of the gums with solutions containing both sodium perborate and catalase, and it includes compositions containing these two substances designed for oral treatment, such as tooth powders, mouth washes, etc.

The invention also includes preparations suitable for facial treatments which contain sodium perborate and catalase, for example, facial creams containing catalase which are to be used with a powder containing sodium perborate. The liberation of the oxygen from the perborate when applied with such a cream draws the blood to the surface and has an exhilarating effect on the face, or other part of the body, to which the cream is applied. This is due at least in part to the force with which the liberated oxygen impinges upon the flesh and to the great number of impacts, produced by the oxygen.

I have found that the liberation of oxygen from sodium perborate by catalase has other valuable applications in physio-therapy, and this invention includes such other applications. For example, if sodium perborate and catalase are added to a bath, either a foot bath, or a body bath, the whole of the bath becomes filled with fine bubbles of oxygen liberated from the sodium perborate which have a desirable systemtic and physio-therapeutic effect on all or any part of the body which may be subjected to the action of the bath. The liberated oxygen appears to have a bleaching effect on the hands and other parts of the body to which it is applied. By including catalase and sodium perborate in clay packs such as clay facial packs, a desirable physio-therapeutic action is added to the pack which ordinary clay packs do not possess. This invention includes baths, packs, etc., which include catalase and sodium perborate.

Catalase is an enzyme which is present in organs of animals, such as the heart, lung, spleen, liver, blood, kidneys of various animals and the mesenteric fat of hogs. It is also formed in seeds (especially sweet clover and alfalfa), plants, fungus and various micro-organisms. It may be recognized by its power of liberating oxygen from hydrogen-peroxide. The scientific literature discloses several methods of preparing extracts of catalase, but all of these methods are undesirable because of the loss of activity of the catalase at each stage of precipitation from solution in alcohol, chloroform, etc. These extracts are unstable and not suitable for commercial purposes. Blood, itself, contains catalase, but blood has no practical value as a catalyst. After standing three or four days the catalase in blood becomes ineffective as a catalyst for the decomposition of sodium perborate in water.

I have found that a dry catalase extract which is stable for prolonged periods of time can be prepared by first extracting the catalase from catalase-containing material with water, precipitating proteins from the solution, then adjusting the pH of the solution to about 7.0 and concentrating and drying at a temperature not over about 50° C. and preferably not over 40° C. The extract thus obtained is so stable that it can be marketed or included in articles of commerce without fear of losing its effectiveness.

The following is illustrative of my method of preparing this stable catalase extract. Beef liver is finely ground by passing it through a chopping machine several times. An equivalent weight of water is added to the liver and the mixture is allowed to stand for six (6) hours. The mixture is then strained through a hundred (100) mesh screen. The residue consisting mostly of fibrin and connective tissue is again extracted with one-half its weight of water for several hours. This extract is then stirred and the solution combined with the first extract. To the combined extract, I add about two parts by weight of sodium benzoate to act as a preservative and allow foreign matter including at least some of the proteins to precipitate. It is also advantageous to use a small quantity of thymol to inhibit the growth of fungus. This mixture is allowed to stand forty-eight (48) hours at room temperature.

At the expiration of this time, the solution which will be found to be slightly reddish and turbid will contain an abundant precipitate. The liquid is very rich in catalase. The precipitate is filtered off and the pH value of the filtrate is adjusted to 7.0. It is desirable to adjust the pH value of the filtrate because otherwise the extract formed will lose its activity.

The extract is then concentrated and evaporated to dryness. A buffer salt such as sodium dibasic phosphate is advantageously added before or during concentration. During the concentration of the solution the temperature is kept below 50° C. The concentration is advantageously effected by evaporation in a vacuum of, for example, 708 millimeters at a temperature of 38.7° C. and then drying on glass trays in a drying chamber at 37.5° C. The dried material is removed from the trays and finely powdered in a grinding machine. The yield of extract is about 200 grams per kilogram of beef liver.

This extract is very active. One gram of the powdered extract will decompose about 20 grams of sodium perborate yielding by displacement about 1500 to 1600 cc. of oxygen. This extract of catalase gives a larger yield of active material and greater catalytic activity than extracts produced by any of the methods previously described.

This extract is sufficiently stable for commercial purposes and can be used for the liberation of oxygen from sodium perborate in various physio-therapeutic treatments including oral treatments, facial treatments, etc. The preparations for these treatments advantageously contain the catalase and sodium perborate in the ratio of one part to about twenty parts.

These various preparations for physio-therapeutic treatments advantageously comprise two powders which are mixed at the time and place of the treatment. The perborate and catalase are not mixed any great time before treatment because the catalase rapidly liberates the oxygen from the perborate. Sodium perborate is not stable in the presence of water and it is, therefore, used in powder form. The catalase is also advantageously used in powdered form. Catalase and sodium perborate are particularly desirable constituents of physio-therapeutic compositions because they are both substantially odorless and neither of these compounds stains organic tissues. Sodium perborate does not have an altogether agreeable taste and it is, therefore, desirable to add to the perborate some flavoring material such as natural or synthetic wintergreen or peppermint, or saccharine may be mixed with the perborate to mask the bad taste. Diluents such as sodium carbonate or sodium bicarbonate or calcium phosphate or sodium chloride are advantageously mixed with the sodium perborate to prevent it from lumping. Coloring matter, etc. may be added to one or both of the ingredients as desired.

I claim:

1. The method of effecting rapid and almost instantaneous liberation of active oxygen from sodium perborate which comprises adding to water sodium perborate and a dry active catalase preparation in powdered form and in amount sufficient to effect rapid and almost instantaneous dissolving and decomposition and rapid liberation of oxygen from the perborate.

2. The method of effecting the rapid and almost instantaneous decomposition of sodium perborate and liberation of active oxygen therefrom which comprises adding a dry mixture of the perborate and of an active catalase preparation to water, with the catalase present in amount sufficient to effect rapid and almost instantaneous decomposition of the perborate and liberation of oxygen therefrom.

3. The method of effecting rapid decomposition and liberation of active oxygen from sodium perborate which comprises admixing with dry sodium perborate a dry, stable catalase preparation (an aqueous solution of which has a pH of about 7.0), the proportions of the catalase to perborate being about 1 part of catalase powder to 20 parts of perborate powder, and the dry mixture being so added to the water that the perborate is rapidly and almost instantaneously decomposed with liberation of active oxygen therefrom.

4. A dry pulverulent composition comprising sodium perborate and a dry stable catalase preparation readily soluble in water, and with the catalase present in amount sufficient to effect rapid and almost instantaneous decomposition of the perborate when the composition is added to water.

5. A dry pulverulent composition comprising sodium perborate and a dry, stable catalase preparation (an aqueous solution of which has a pH of substantially 7.0) in the proportions of about 1 part of catalase to 20 parts of perborate, said composition having the property, when added to water, that the perborate will be readily and almost instantaneously decomposed by the catalase and active oxygen generated therefrom.

6. A tooth powder composition comprising dry, powdered sodium perborate and a dry, stable powdered catalase preparation, in such proportions that when the composition is used as a tooth powder and brought into contact with water the catalase will effect rapid and almost instantaneous decomposition of the perborate with liberation of active oxygen therefrom and without formation of objectionable amounts of hydrogen peroxide.

FRANK C. KERWIN.